Aug. 13, 1968   GUSTAV-ADOLF SIXEL   3,397,276
ELECTRIC-ARC SMELTING FURNACE
Filed June 7, 1965

Inventor:
Gustaf-Adolf Sixel
By Ernest G...montague
Attorney

United States Patent Office 3,397,276
Patented Aug. 13, 1968

3,397,276
ELECTRIC-ARC SMELTING FURNACE
Gustav-Adolf Sixel, Dusseldorf-Kaiserswerth, Germany, assignor to Beteiligungs- und Patentverwaltungsgesellschaft mit beschrankter Haftung, Essen, Germany, a corporation of Germany
Filed June 7, 1965, Ser. No. 461,664
Claims priority, application Germany, June 12, 1964, B 77,220
3 Claims. (Cl. 13—10)

ABSTRACT OF THE DISCLOSURE

An electric-arc smelting furnace for smelting of steel, a furnace pot containing a liquid, means for performing at least one of tipping, rotating and displacing movements of the furnace pot, which means are disposed above the level of the liquid content and comprises a ring disposed at the outer periphery of the furnace pot above the level of the liquid content. Carrying rollers support the rotating ring and a carrying ring including tipping pivots is provided and the carrying rollers are suspended from the carrying ring.

---

Figure 1:
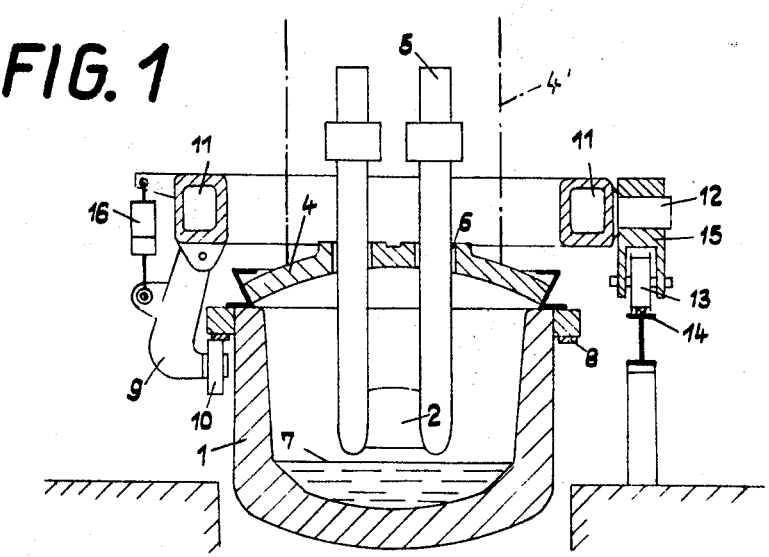

The present invention relates to an electric-arc smelting furnace adapted particularly for smelting steel, the furnace pot of the smelting furnace is capable of being tipped, and/or is capable of being rotated and/or is capable of being rolled.

There are known electric-arc steel smelting furnaces which are installed in a furnace house located between the melting house and the charging house, and wherein the furnace pot is rolled into the charging house for the charging procedure. For this purpose, the furnace pot is mounted on an undercarriage equipped with wheels. The undercarriage, in turn, rests on a tipping bridge which makes it possible to tip the pot about a horizontal axis so as to discharge the liquid steel. In these conventional electric-arc steel smelting furnaces, additionally rotating rollers are built into the undercarriage for the required rotational movement of the furnace pot about the vertical furnace axis, for example, for the smelting of scrap iron, whereby a rotating ring rigidly connected with the furnace pot rests on the rotating rollers.

Furthermore, it has been proposed already for electric-arc smelting furnaces, the furnace pot of which is not rollable, to design the furnace pot such that it supports itself on a carrying ring provided with swivel pivots about which the furnace pot can be tipped. The furnace pot is thereby mounted on balls in the carrying ring so that it can be rotated in the carrying ring by means of a rotating drive provided at the furnace bottom.

It is a disadvantage in the known electric-arc smelting furnaces, that the devices required for the various movements of the furnace pot are all located below the liquid metal and slag surface, respectively, and are only partly outside of the outer periphery of the furnace vessel. Consequently, these devices are particularly in a great danger in case of a break-through of the liquid furnace content through the furnace wall, which cannot be avoided with the greatest safety. In addition, this arrangement of the devices serving for the various furnace movements makes it more difficult to the suitable provision of the furnace tap hole, the slag removal, as well as the feeding of the additional substances into the furnace pot. It is also disadvantageous that the furnace pot can be removed only in upward direction in case of a replacement, since a traveling crane is required therefor, the lifting power of which must amount to a multiple of the lifting power required for charging.

It is one object of the present invention to provide an electric-arc smelting furnace which eliminates the disadvantages inherent in the known electric-arc melting furnaces as described above.

It is another object of the present invention to provide an electric-arc smelting furnace, wherein the devices required for the tipping and/or rotating and/or rolling are disposed above the liquid furnace content.

It is still another object of the present invention to provide an electric-arc smelting furnace, wherein the furnace pot is equipped on its outer periphery above the liquid furnace content with a rotating ring which is mounted on carrying rollers suspended on a carrying ring provided with tipping pivots.

Apart from the fact that the maintenance and repair of the parts serving the various furnace movements is very simple in the new electric-arc smelting furnace, by its application it is also insured that a break-through of the liquid furnace content occurring through the furnace wall does not damage the rotating, tipping and rolling devices or put them out of operation.

It is yet a further object of the present invention to provide an electric-arc smelting furnace in order to locate the furnace pot, wherein the carrying rollers are disposed on levers, which are swingably secured to the carrying ring, for instance, for new equipment at the place provided therefor, without necessitating a correspondingly longer armed traveling crane.

Figure 2:
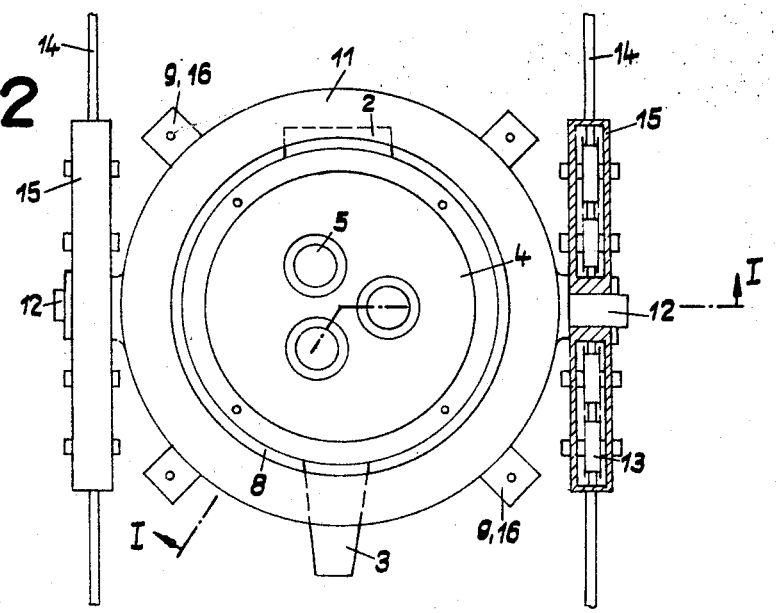

With these and other objects in view, which will become apparent in the following detailed descripiton, the present invention will be clearly understood in connection with the accompanying drawings, in which:

FIGURE 1 is a vertical section of an electric-arc steel smelting furnace, taken along the lines 1—1 of FIG. 2; and FIG. 2 is a partly sectional top plan view.

Referring now to the drawing, a furnace pot 1 having a puddling door 2 and a tapping lip 3 is covered by a furnace cover 4 which can be raised by means of a lifting device, only schematically shown by dot-dash lines 4', for the movement of the furnace pot 1 out of the furnace house into the charging house for filling the furnace pot 1 thereat with the charge material.

Electrodes 5 extend through openings 6 of the furnace cover 4 into the furnace pot 1 and are disposed with their ends above the liquid furnace content in the operative position. The furnace pot 1 together with a rotating ring 8 attached to the furnace pot 1 at the height of the furnace cover 4, rests on carrying rollers 10 mounted on levers 9. By a non-conventional driving device (not shown), the furnace pot 1 can be rotated with the rotating ring 8 about the vertical furnace axis, for example, when smelting scrap iron.

The carrying rollers 10 on which the furnace pot 1 rests, as well as the levers 9 are secured to a carrying ring 11, which is journalled with its tipping pivots 12 in a frame 15 rollable along rails 14 by means of wheels 13. The frame 15 is moved thereby by a conventional drive (not shown).

The furnace pot 1 is tipped about the tipping pivots 12, upon removal of the electrodes 5, so as to discharge the liquid furnace content 7 over the tapping lip 3. Should the furnace pot require replacement, it will be raised somewhat from below by a lifting carriage (not shown) and the levers 9 with the carrying rollers 10 secured thereto are subjected to an outward swinging movement by means of lifting devices 16.

While I have disclosed one embodiment of the present invention, it is to be understood that this embodiment is given by example only and not in a limiting sense, the scope of the present invention being determined by the objects and the claims.

I claim:
1. An electric-arc smelting furnace particularly for melting of steel, comprising
 a furnace pot containing a liquid content,
  means for performing at least one of tipping, rotating and displacing movements of said furnace pot,
 said means being disposed above the level of said liquid content in said furnace pot,
 said means comprises a ring disposed at the outer periphery of said furnace pot above the level of said liquid content,
 carrying rollers supporting said rotating ring,
 a carrying ring including tipping pivots, and said carrying rollers being suspended from said carrying ring.
2. The smelting furnace, as set forth in claim 1, which ncludes levers pivotally secured to said carrying ring, and said carrying rollers are operatively mounted on said levers.
3. The smelting furnace, as set forth in claim 1, which includes
 a rollable frame supporting said carrying ring by means of said tipping pivots.

References Cited

UNITED STATES PATENTS 3,102,154  8/1963  Renton _____ 13—10

BERNARD A. GILHEANY, *Primary Examiner.*

H. B. GILSON, *Assistant Examiner.*